(12) United States Patent
Jacobs et al.

(10) Patent No.: US 6,264,453 B1
(45) Date of Patent: Jul. 24, 2001

(54) ARTICLE AND METHOD FOR COMPOSITE TIRE MOLD BLADES

(75) Inventors: Bernard Byron Jacobs, Akron; Gregory Lee Loney, Cuyahoga Falls, both of OH (US); Richard Allen Root, East Amherst, NY (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/485,176

(22) PCT Filed: Oct. 27, 1997

(86) PCT No.: PCT/US97/19258

§ 371 Date: Feb. 3, 2000

§ 102(e) Date: Feb. 3, 2000

(87) PCT Pub. No.: WO99/21701

PCT Pub. Date: May 6, 1999

(51) Int. Cl.[7] .............. B29D 30/06; B22F 7/08; B29C 33/42

(52) U.S. Cl. ........... 425/28.1; 72/379.2; 76/101.1; 152/DIG. 3; 419/66

(58) Field of Search .............. 425/28.1, 35, 46; 152/DIG. 3; 419/8, 66; 72/379.2; 76/101.1

(56) References Cited

U.S. PATENT DOCUMENTS

| | | | |
|---|---|---|---|
| D. 213,751 | 4/1969 | Mitch | D90/20 |
| D. 229,827 | 1/1974 | Hart et al. | D12/152 |
| D. 231,210 | 4/1974 | Holmes | D12/146 |
| D. 231,211 | 4/1974 | Holmes | D12/146 |
| D. 236,608 | 9/1975 | Holmes et al. | D12/146 |
| D. 243,168 | 1/1977 | Hart et al. | D12/146 |
| D. 247,558 | 3/1978 | Flint et al. | D12/143 |
| D. 247,559 | 3/1978 | Flint et al. | D12/143 |
| 2,109,691 | 3/1938 | D'Ayguesvives | 152/14 |
| 2,192,130 | 2/1940 | Errig et al. | 90/24 |
| 2,267,406 | 12/1941 | Krusemark | 152/209 |
| 2,736,924 | 3/1956 | Bean . | |
| 3,283,053 | 11/1966 | Felker | 264/277 |
| 3,581,535 | 6/1971 | Hinks et al. | 72/7 |
| 3,880,020 | 4/1975 | Clem | 76/104 |
| 3,991,802 | 11/1976 | Yokota et al. | 152/210 |
| 3,998,256 | 12/1976 | Verdier | 152/209 R |
| 4,154,564 | * 5/1979 | French | 425/28.1 |
| 4,303,115 | 12/1981 | Flechtner et al. | 152/209 R |
| 4,723,584 | 2/1988 | Yamaguchi et al. | 152/209 R |
| 5,048,583 | 9/1991 | Goto et al. | 152/209 R |
| 5,203,933 | 4/1993 | Nagahisa | 152/209 R |
| 5,385,189 | 1/1995 | Aoki et al. | 152/209 R |
| 5,415,215 | 5/1995 | Covert et al. | 152/209 A |
| 5,964,118 | * 10/1999 | Kamata | 72/286 |

FOREIGN PATENT DOCUMENTS

| | | |
|---|---|---|
| 11 69 651 B | 5/1964 | (DE) . |
| 22 06 897 A | 9/1972 | (DE) . |
| 0774307 | 5/1997 | (EP) . |
| 1 573 492 A | 7/1969 | (FR) . |
| 2 137 809 A | 12/1972 | (FR) . |
| 1 460 592 A | 1/1977 | (GB) . |

\* cited by examiner

*Primary Examiner*—James P. Mackey
(74) *Attorney, Agent, or Firm*—David L King

(57) ABSTRACT

A composite blade (10, 10A through 10F) for use in a tire cure mold and the method of fabricating the composite blade employs the steps of forming a blade blank (12) and encapsulating at least one end (14, 16) in a second material by placing the end (14, 16) in a die and molding an enlarged cross-section (20) of a second material around the end (14, 16). Preferably the second material is a powdered metal.

11 Claims, 5 Drawing Sheets

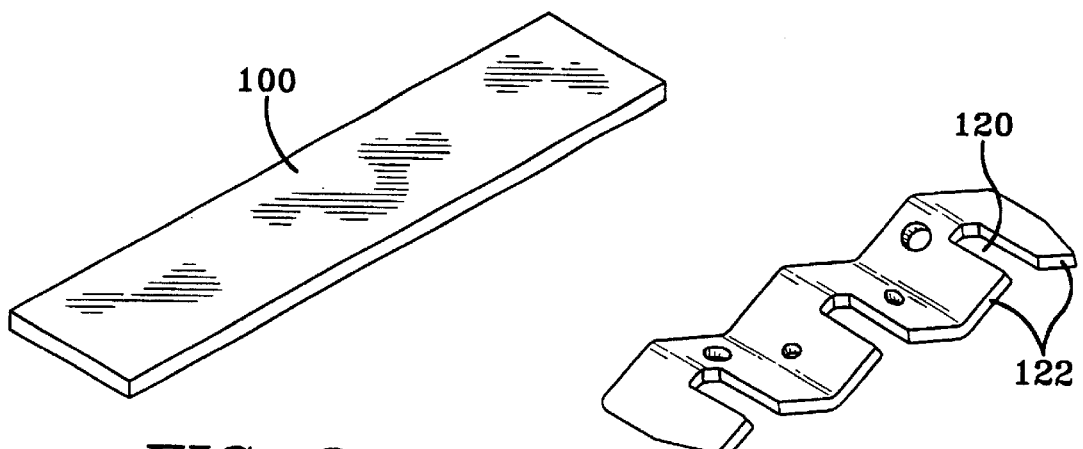
FIG-8
PRIOR ART
FIG-11
PRIOR ART
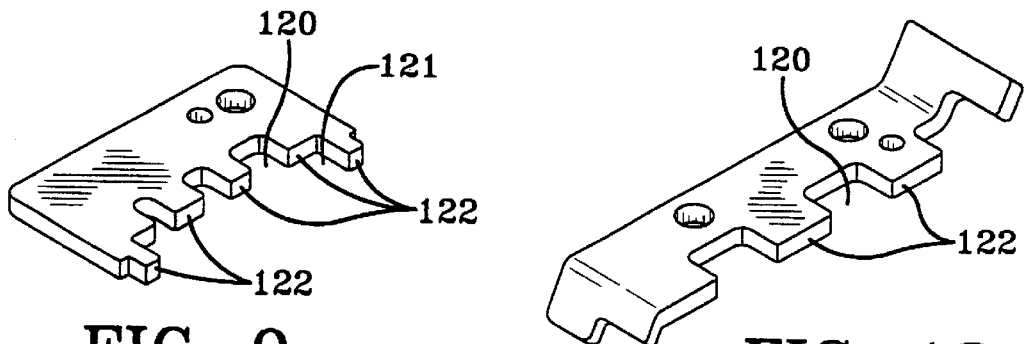
FIG-9
PRIOR ART
FIG-12
PRIOR ART
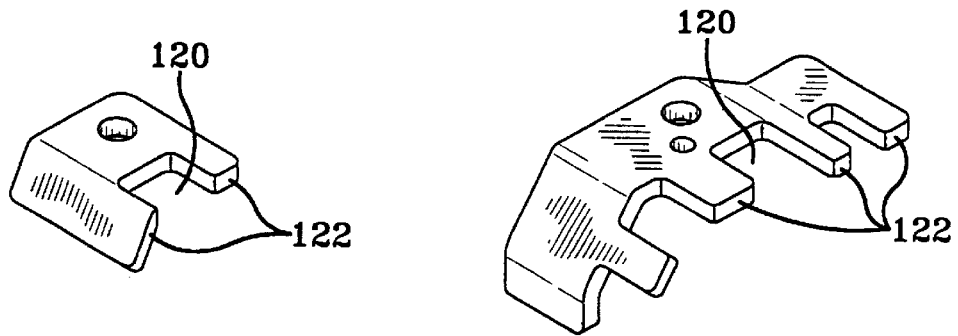
FIG-10
PRIOR ART
FIG-13
PRIOR ART

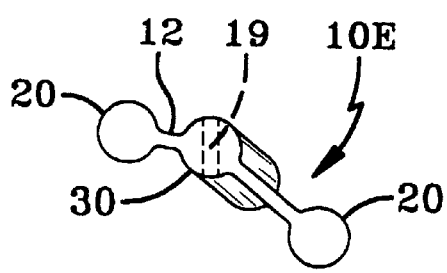
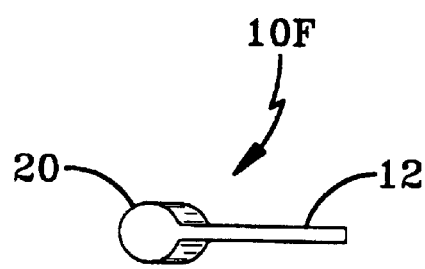
FIG-23
FIG-25
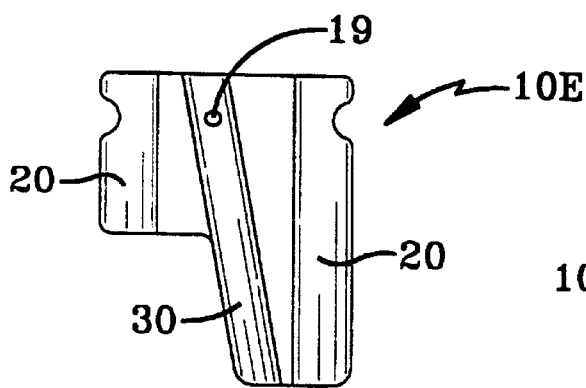
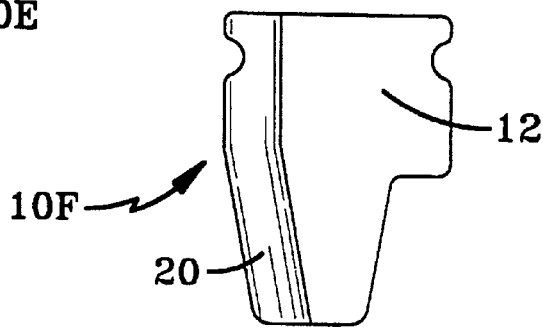
FIG-22
FIG-24

ARTICLE AND METHOD FOR COMPOSITE TIRE MOLD BLADES

TECHNICAL FIELD

The present invention relates to blades for the curing mold. More particularly to a composite type blade which has rounded ends and a method of fabricating such composite blades.

BACKGROUND OF THE INVENTION

Blades for tire curing molds are well known in the art of tire manufacture. Such blades are conventionally made from a running length or strip of a metallic material such as steel, stainless steel or brass. The strip is generally about 0.020 inches (0.5 mm) to 0.040 inches (1 mm) thick and has a width of about one half to 1½ inches. Sometimes the strips are of solid form other times perforated strips are used to form the blade.

In U.S. Pat. No. 3,880,020 a method and apparatus for making blades is disclosed which enables small quantity lots of a multiplicity of different styles of blades to be made rapidly and economically. The method and apparatus permits blades to be blanked out from the stack of material by a plurality of punch and die sets while the stock remains securely attached to an endless loop carrier. The invention uses a plurality of suppresses for forming bends in the blade if desired.

In U.S. Pat. No. 3,581,535 a similar method and apparatus for making blades is disclosed. The method and apparatus for making blades for use in tire molds includes piercing, notching, bending or otherwise altering the shape of a free end of strip material by successively positioning the free end and a plurality of shape altering tools in operative engagement and cutting off the formed blade from the free end.

The reader can appreciate or visualize finished blades of a given style falling into a large box after being formed and cut from the strip of blade stock.

The complexity of this automated blade forming apparatus make it abundantly clear that the formed blade must be rather simple in construction as shown in the appended prior art FIGS. 8 through 13. Bends, cuts, notches and holes are possible. What has not been possible to date was the employment of more complex shapes or varying the thickness of the blade at a specific location.

In French Patent 2,137,309 and U.S. Pat. No. 2,736,924 the features found in the preamble of claim 1 is shown.

The blade creates a sipe, which is a narrow groove or incision in the tread. The lateral ends of the blade, even if polished or ground round is a subsequent deburring operations, are sufficiently narrow to initiate crack propagation at this highly stressed region of tread.

To avoid this problem it has been an objective of the present invention to create blade ends and blade bends that are effective at stress relieving the tread elements adjacent the resultant sipe.

SUMMARY OF THE INVENTION

A blade for use in a tire mold is formed from blade blanks having at least two ends and at least one end cap having a substantially enlarged cross-section relative to the blade blank. Each end cap is attached to one end of the blade blank.

Preferably the end cap is of a second material, most preferably being a powdered metal. To facilitate attachment of the end cap at least one of the ends is crimped, notched or perforated so that when the end of the blade blank is placed in the mold for forming the end cap the crimped notched or perforated end is encapsulated by the material used to form the end cap. Preferably the enlarged end cap has a rounded cross section.

The blank may include one or more bends between the two ends. A bend cap having a substantially enlarged cross-section is attached to the blade blank at a bend, the bend cap being attached in a similar way as the end cap and preferably has a rounded cross-section.

Preferably the blade blank is metal, of brass, steel or stainless steel.

The method of fabricating a composite blade for use in a tire mold has the steps of forming a blade blank having at least two ends, placing one or more ends of the blade blank in a die and molding a second material around the one or more ends forming a rounded end at least partially encapsulating the one or more ends of the steel blade blank. The method may further have the step of crimping, notching or perforating the blade blank ends prior to molding thus encapsulating the crimp, notch or perforated end. The method may further include bending the blade blank and then molding a second material around the bend similar to the method of making the end cap.

BRIEF DESCRIPTION OF THE FIGURES

FIG. 8 is a portion of the strip used to form a blade.

FIGS. 9 through 13 show various prior art blades of differing shapes commonly used in tire molds, each such blade has ends or ends and bends which create stress risers in the tread element.

FIGS. 14–25 are representations of plan and top views of a variety of different composite blades of the present invention.

DETAILED DESCRIPTION OF THE INVENTION

With reference to FIG. 8 a portion of a strip (100) of metallic material commonly used to form blades for tire curing molds is shown.

The resultant blades once stamped or punched out from the strip (100) took various shapes as shown in FIGS. 9 through 13. The blades could have any number of slots (120) or cuts (121) to form the various projections (122), the projections for forming the resultant sipe in the tread of a molded tire. These features are well known in the tire building art.

Figure 2:
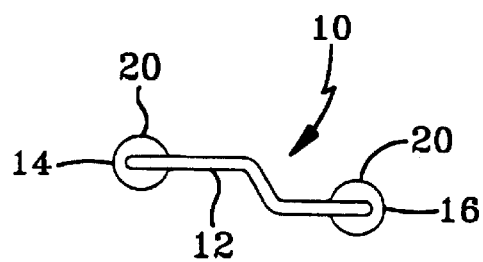
FIG. 2 is a top view of FIG. 1.
Figure 1:
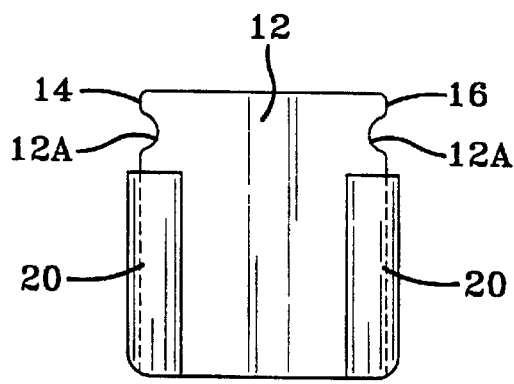
FIG. 1 is a view of a blade having the ends encapsulated with cap ends.

With attention now to FIGS. 1 and 2, a composite blade (10) of the present invention is shown. The composite blade (10) is formed of a blade blank (12), the blade blank (12) having a pair of ends (14, 16). Encapsulating the ends (14, 16) are end caps (20). Each end cap (20) at least partially if not completely encapsulates the respective ends (14, 16) as shown. The top view of the blade (10) shows that the end caps (20) are of a cross-section that is preferably rounded or circular. Alternatively the end cap (20) can be of any number of shapes such as elliptical, conical etc., preferably avoiding sharp edges which can induce crack propagation.

Figure 4:
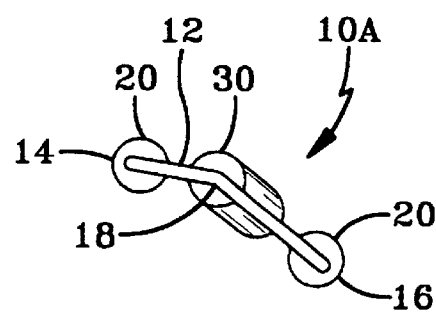
FIG. 4 is a top view of FIG. 3.
Figure 3:
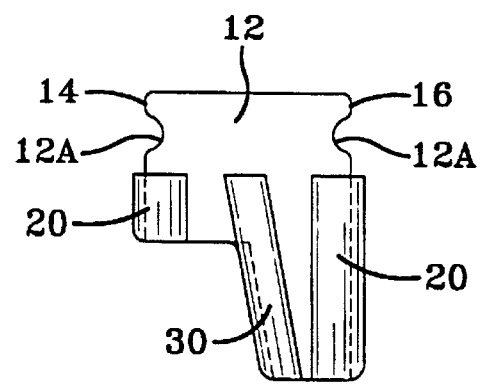
FIG. 3, is a view of a blade having the ends capped and a bend encapsulated with a bend cap.

In FIGS. 3 and 4 the blade (10A) further has a bend (18) the bend (18) being encapsulated by a bend cap (30). The bend cap (30) preferably is a similar cross section as the end caps (20).

If the blade blanks (12) are 0.020 to 030 of an inch (0.5 mm to 0.8 mm) thick, the end caps (20) and bend caps (30) preferably are about four times the thickness of the blade blank (12). At a thickness of greater than 0.030 to 0.050 of an inch (0.8 mm to 1.3 mm) the end caps (30) and bend caps (30) are about three times the thickness of the blade blank (12).

Figure 5:
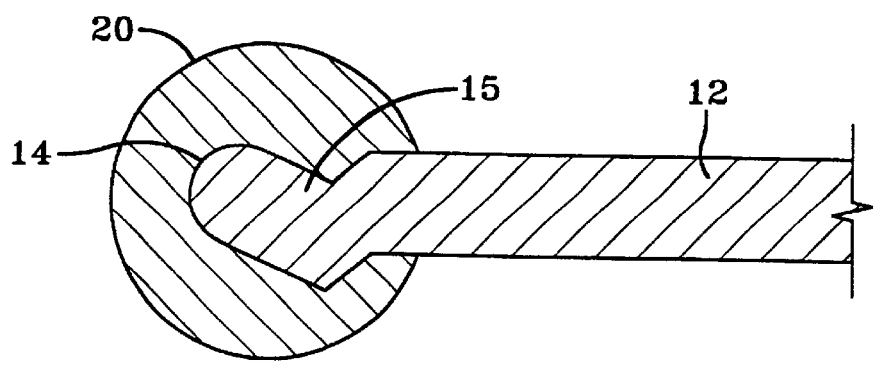
FIGS. 5, 6, and 7 are cross sectional view showing a crimped end, a notch and perforation as additional means for attaching cap ends or cap bends.
Figure 6:
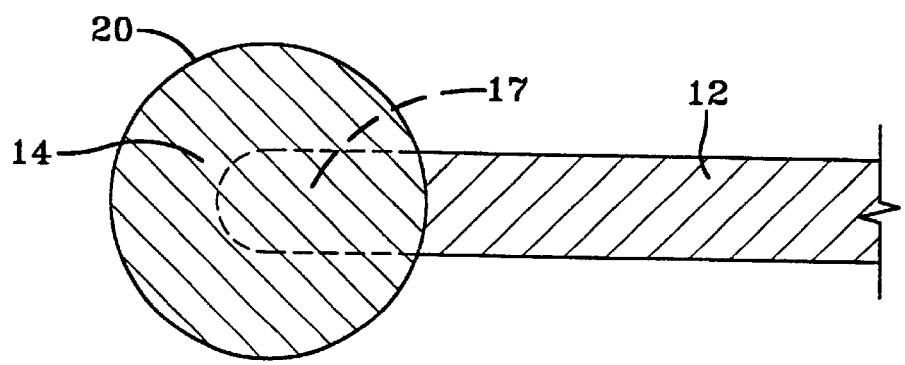
Figure 7:
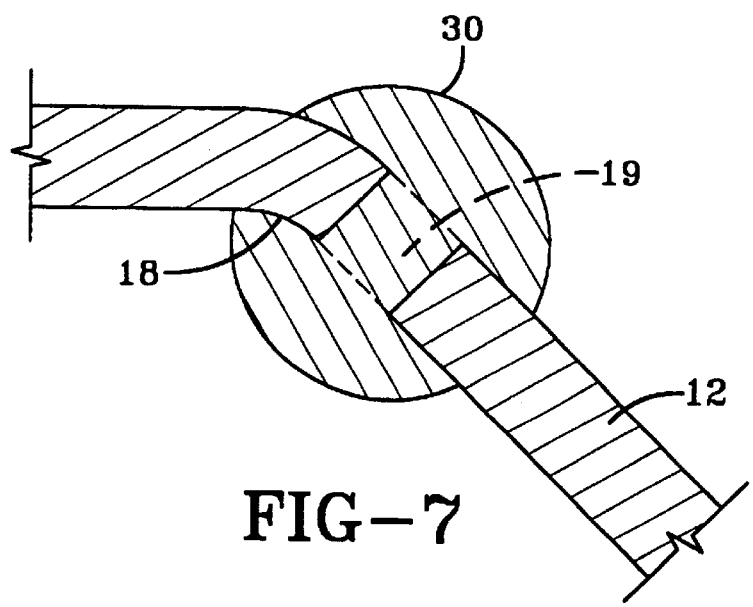
Figure 15:
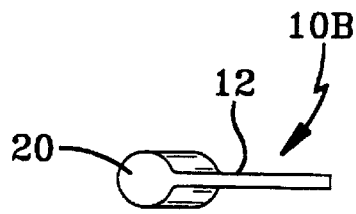
Figure 17:
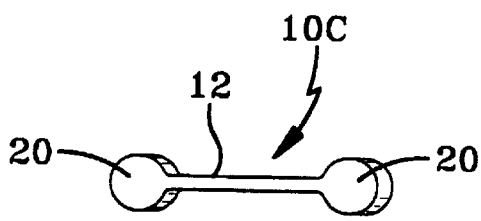
Figure 14:
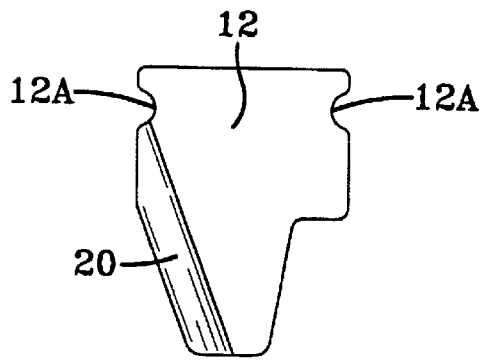
Figure 16:
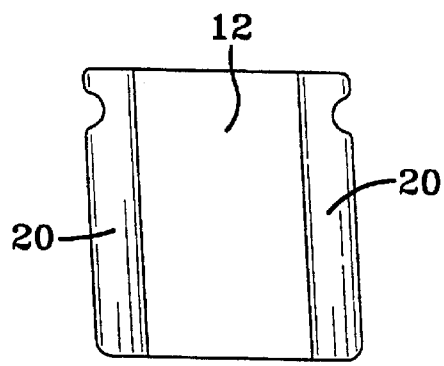
Figure 19:
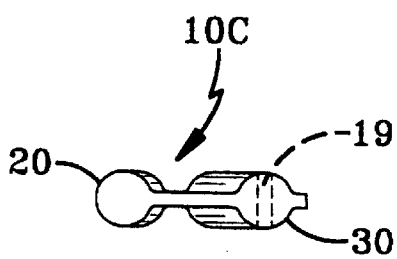
Figure 21:
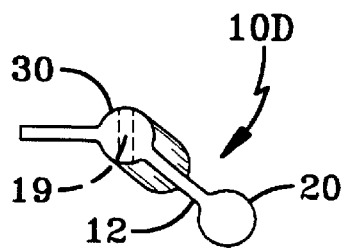
Figure 18:
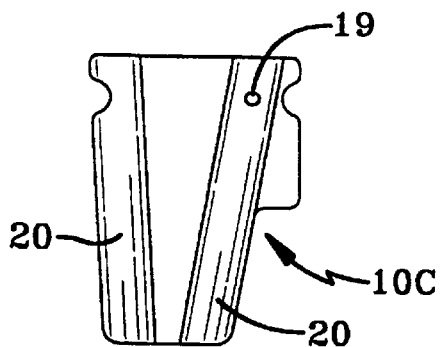
Figure 20:
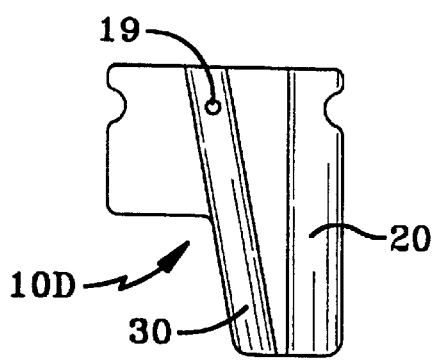

In FIGS. 5, 6 and 7, several means for securing the end caps (20) or bend caps (30) around the blade blank (12) are shown. The first means shown in FIG. 5 is crimping the end of (14 or 16) of a blade blank (12). The crimped end (15) provides an increased surface contact area and cantilevered spring loaded portion which when placed in a mold under high pressure results in better adhesion of the end cap (20).

It must be remembered that these end caps (20) and bend caps (30) must be sufficiently anchored to the blade (12) or the tire mold to insure that they do not pull out when the tread is extracted from the tire cure mold.

In FIG. 6, the end cap (20) is shown encapsulating an end (14 or 16) having a notch (17). In FIG. 7 the bend cap (30) is shown encapsulating a bend (18), the blade blank having perforated holes (19) which when placed in a cap mold have the cap material flow into the holes (19) which anchors the bend cap (30) to the blade blank (12).

The use of notches (17), perforated holes (19) or crimped ends (15) can be found at ends (14, 16) or at the bends (18). Alternatively no mechanical enhancement to attachment of the caps to the blades may be needed, particularly if the cap ends (20) or the bend cap (30) is inclined or sloped relative to the radial direction when placed in an annular tread mold.

The composite blades (10B through 10F) of the present invention can be fabricated in any number of shapes. FIGS. 14 through 25 illustrate a few of these exemplary shapes.

The beneficial attributes of these composite blades (10, 10A through 10F) rest primarily in their ability to prevent crack propagation at the sipes of the tread elements. These blades (10, 10A through 10F) enable the tire designer to use a wider variety of tread compounds or alternatively to design a deeper tread depth than before with a siped tread.

The preferred method of manufacturing the composite blades (10, 10A through 10F) is to form a blade bank (12) of any desired shape, the blank (12) having at least two ends. Placing the end of a blank in a die and molding a second material forming a enlarged end at least partially encapsulating the one or more ends of the steel blade blank.

The second material can be any material of sufficient durability to withstand the rigors of heat pressure and abrasion the part will be exposed to during the tire curing process. Preferably the second material is a powdered metal, most preferably the powdered metal is of the ferrous type commercially sold and made of stainless 316 alloy powdered metal.

The method may further include the steps of bending, crimping, or notching or perforating with holes the blade blank (12) prior to molding the second material.

The method may further include the step of placing the bend (18) of a blade blank (12) into a die, molding a second material around or adjacent to the bend (18) forming an enlarged bend cap (30) at least partially encapsulating the bend (18).

Preferably the enlarged ends (20) or bend caps (30) have a substantially rounded cross-section.

As can be seen, the second material need only extend partially covering the blade end (14, 16) or bend (18). The remaining portion (12A) of the blade (12) is at least partially used to anchor the blade in the mold as is commonly understood in the art.

The end caps (20) and bends (30) are sufficiently small that the cost of material is very low, the time to mold is consequently very fast. The cost, therefore, is about one third that of trying to bend or otherwise form a round end or bend and unlike a bent round end, there is no open seam to tear or catch rubber in during the tire molding process. For all these reasons the invention as presented above should be widely accepted as a preferred way of making such a blade.

What is claimed is:

1. A blade (10) for use in a tire mold, the blade being characterized by:
    a metal blade blank (12) having at least two ends (14, 16);
    at least one end cap (20) having a substantially larger cross-section relative to the metal blade blank (12), the end cap (20) being attached to one end (14, 16) of the metal blade blank characterized in that the at least one end cap (20) is of a second material the second material being a powdered metal molded to form an enlarged end at least partially encapsulating the one or more ends (14, 16) of the blade blank (12).

2. The blade (10) of claim 1, wherein at least one of the ends (14, 16) of the metal blade blank (12) is crimped.

3. The blade (10) of claim 1, wherein at least one of the ends (14, 16) of the metal blade blank (12) is notched.

4. The blade (10) of claim 1, wherein the metal blade blank (12) has one or more bends (18) between the two ends (14, 16).

5. The blade (10) of claim 1, wherein the blade (10) further is characterized by bend caps (30), the bend caps (30) having substantially rounded cross-section, each bend cap (30) being a powdered metal molded to the metal blade blank (12) at a bend (18).

6. The blade (10) of claim 1, wherein the blade blank (12) is steel.

7. The blade (10) of claim 1, wherein the end cap (20) cross-section is substantially rounded.

8. A method of fabricating the composite blade (10) for use in a tire mold of claim 1 comprising the steps of:
    forming a metal blade blank (12) having at least two ends (14, 16);
    characterized in that placing one or more ends (14, 16) of the metal blade blank (12) in a die and molding a second powdered metal material forming an end cap (20) at least partially encapsulating the one or more ends (14, 16) of the metal blade blank (12).

9. The method of fabricating a composite blade (10) of claim 8 further include the step of crimping the one or more ends (14, 16) of the metal blade blank (12) prior to molding a second powdered metal material, thus, encapsulating the crimped end (14, 16).

10. The method of fabricating a composite blade (10) of claim 9, further includes the step of notching the one or more ends (14, 16) of the metal blade blank (12) prior to molding the second powdered metal material, thus, encapsulating the notched end (14, 16).

11. The method of fabricating a composite blade (10) for use in a tire mold comprising the steps of:

forming a metal blade blank (12) having two or more ends (14, 16) and at least one bend (18) located between the two ends (14, 16); characterized in that placing at least one bend (18) of the metal blade blank (12) in a die and molding a second powdered metal material forming a bend cap (30) at least partially encapsulating the bend (18) of the metal blade blank (12).

\* \* \* \* \*